United States Patent
Xiao et al.

(10) Patent No.: US 8,787,668 B2
(45) Date of Patent: Jul. 22, 2014

(54) COMPUTING DEVICE AND METHOD FOR ISOLATING AND CUTTING OUT FIGURES IN DESIGN PATENT DOCUMENT

(75) Inventors: Wei-Qing Xiao, Shenzhen (CN); Chung-I Lee, New Taipei (TW); Chien-Fa Yeh, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 324 days.

(21) Appl. No.: 13/339,181

(22) Filed: Dec. 28, 2011

(65) Prior Publication Data

US 2012/0195504 A1  Aug. 2, 2012

(30) Foreign Application Priority Data

Jan. 27, 2011  (CN) .......................... 2011 1 0028759

(51) Int. Cl.
*G06K 9/34* (2006.01)
(52) U.S. Cl.
USPC .......................................... 382/171; 382/173

(58) Field of Classification Search
None
See application file for complete search history.

(56) References Cited

U.S. PATENT DOCUMENTS

| | | | |
|---|---|---|---|
| 5,859,921 A * | 1/1999 | Suzuki | 382/118 |
| 2002/0037102 A1* | 3/2002 | Toda | 382/168 |
| 2005/0100219 A1* | 5/2005 | Berkner et al. | 382/190 |
| 2007/0154091 A1* | 7/2007 | Toda | 382/172 |
| 2009/0324026 A1* | 12/2009 | Kletter | 382/124 |
| 2010/0054585 A1* | 3/2010 | Guillou et al. | 382/164 |
| 2011/0007366 A1* | 1/2011 | Sarkar et al. | 358/462 |
| 2011/0007970 A1* | 1/2011 | Saund | 382/176 |

* cited by examiner

*Primary Examiner* — Jingge Wu
(74) *Attorney, Agent, or Firm* — Novak Druce Connolly Bove + Quigg LLP

(57) ABSTRACT

A method for isolating and cutting out figures in a design patent document divides each page of a figure section of the design patent document into a multiplicity of areas according to histograms, which are created based on information of black pixels and white pixels in a black-and-white image of the page. The method selects the areas that include the figures of the design patent, and displays the selected areas on a display device.

12 Claims, 9 Drawing Sheets

COMPUTING DEVICE AND METHOD FOR ISOLATING AND CUTTING OUT FIGURES IN DESIGN PATENT DOCUMENT

BACKGROUND

1. Technical Field

Embodiments of the present disclosure generally relate to data analysis technology, and more particularly to a computing device and a method for isolating and cutting out figures in a design patent document.

2. Description of Related Art

When users read a design patent document, the whole document is displayed, but the figures of the design patent cannot be displayed separately. Users cannot read the figures to understand intuitively the characteristics of the design patent. Furthermore, when users want to search design patent documents that satisfy certain conditions, a search result is obtained based on one or more keywords, but keyword searches cannot be applied to the figures.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
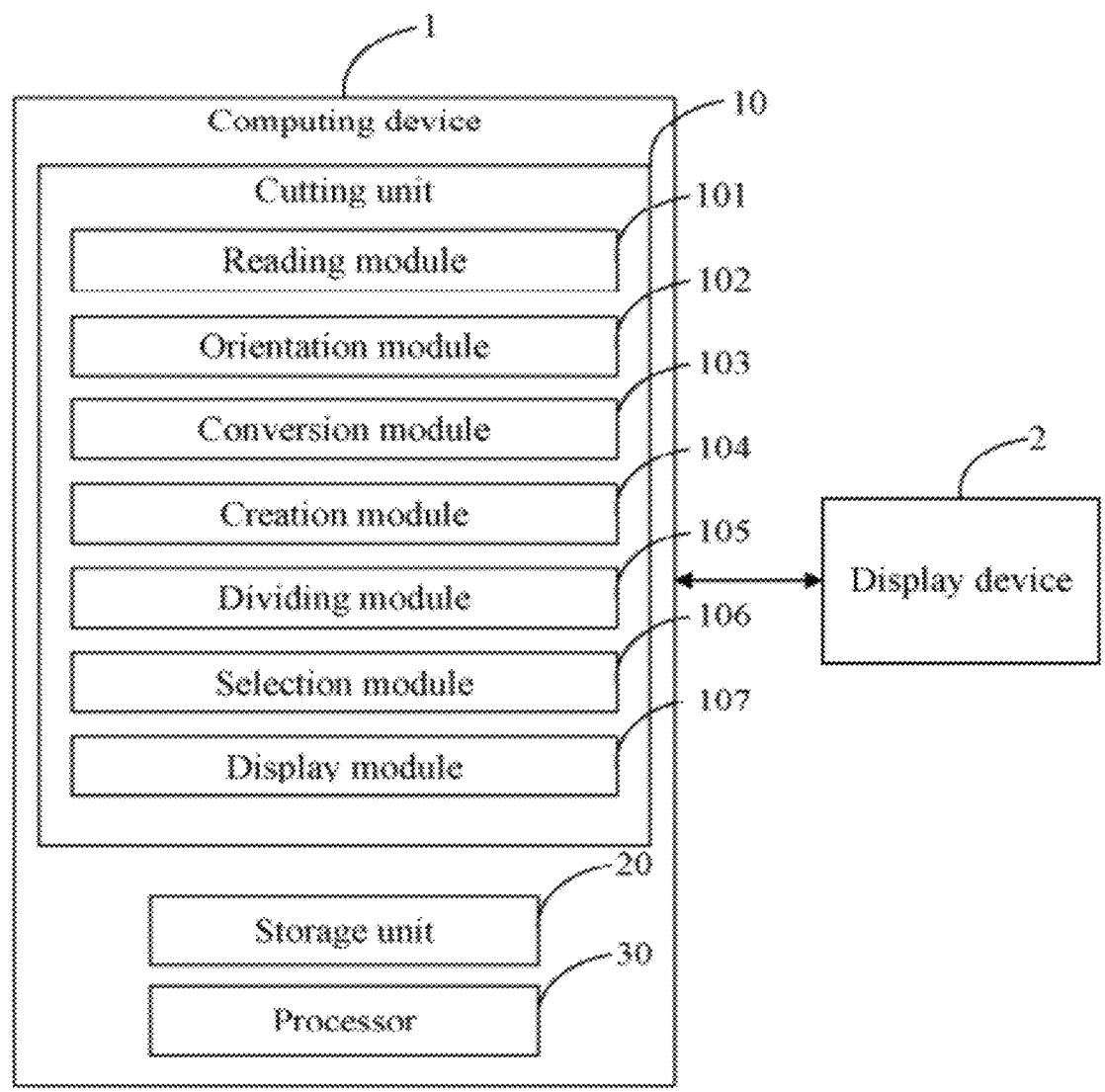
FIG. 1 is a block diagram of one embodiment of a computing device.

FIG. 1 is a block diagram of one embodiment of a computing device 1. In one embodiment, the computing device 1 includes a cutting unit 10 for isolating and cutting out figures in a design patent document, a storage unit 20, and a processor 30. The computing device 1 is electrically connected to a display device 2. The display device 3 displays the design patent document and the figures cut out from the design patent document.

In one embodiment, the cutting unit 10 may include one or more function modules (a list is given in FIG. 1). The one or more function modules may comprise computerized code in the form of one or more programs that are stored in the storage unit 20, and executed by the processor 30 to provide the functions of the cutting unit 10. The storage unit 20 may be a cache or a dedicated memory, such as an EPROM or a flash memory.

In one embodiment, the cutting unit 10 includes a reading module 101, an orientation module 102, a conversion module 103, a creation module 104, a dividing module 105, a selection module 106, and a display module 107.

The reading module 101 is operable to read a figure section of a design patent document. The figure section of the design patent document includes one or more figures of the design patent document.

The orientation module 102 is operable to orientate all of the figures in the figure section in the same direction (have the same display aspect). In one embodiment, the orientation module 102 rotates at least once a figure in the figure section by ninety degrees clockwise in response to the figure is displayed on the figure section in a wrong orientation. The wrong orientation of the figure may be defined as the figure being in landscape view instead of portrait view when the patent document is written because the width of the figure is greater than the height of the figure.

Figure 2A:
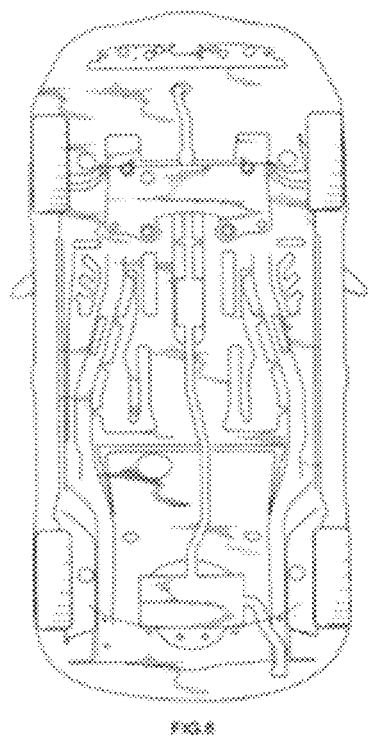
FIG. 2A is a schematic diagram of one embodiment of a black-and-white image.

The conversion module 103 is operable to convert each page of the figure section into a black-and-white image. The conversion module 103 first determines whether the page of the figure section is in color. If the page of the figure section is in color, the conversion module 103 converts the page into a grayscale image. The grayscale image has 256 different shades of gray, where the pixel values can range from 0 to 255. The conversion module 103 converts the grayscale image into a black-and-white image by reference to a predetermined pixel value. In the grayscale image, the areas in which the pixel values are more than the predetermined pixel value are converted into white areas, and the areas in which the pixel values are less than the predetermined pixel value are converted into black areas. A pixel value of 255 denotes a blank or white area, and a pixel value of 0 denotes a black area (hereinafter, pixels with the value of 255 are regarded as white pixels, and pixels with the value of 0 are regarded as black pixels). FIG. 2A is a schematic diagram of one embodiment of the black-and-white image.

Figure 2B:
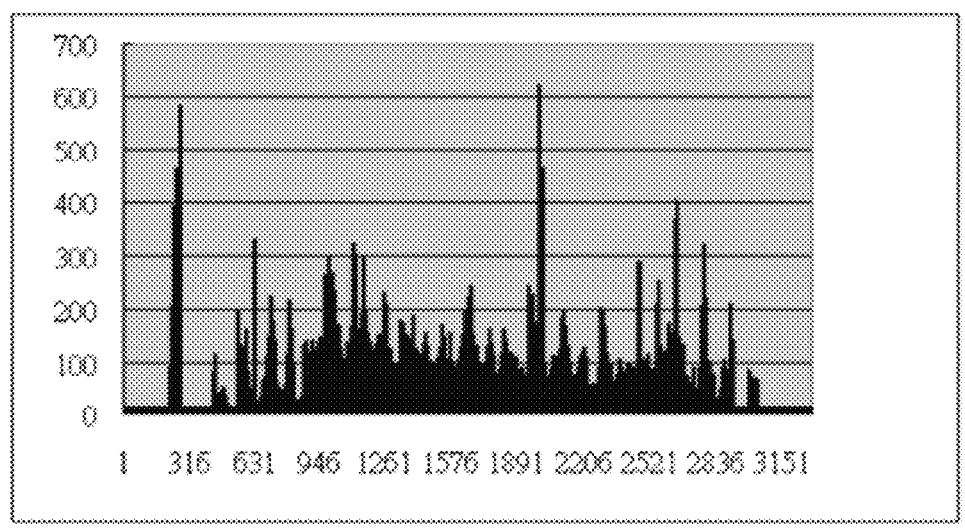
FIG. 2B is a first histogram based on pixel information of each row in the black-and-white image in FIG. 2A.

The creation module 104 is operable to create a first histogram based on information of the black pixels and the white pixels in the black-and-white image. In the first histogram, the X-axis or horizontal axis represents the series of numbered rows from the bottom to the top of the black-and-white image, and the Y-axis or vertical axis represents the quantity of the black pixels in each row of the black-and-white image. FIG. 2B shows a first histogram based on pixel information of each row in the black-and-white image in FIG. 2A.

Figure 2C:
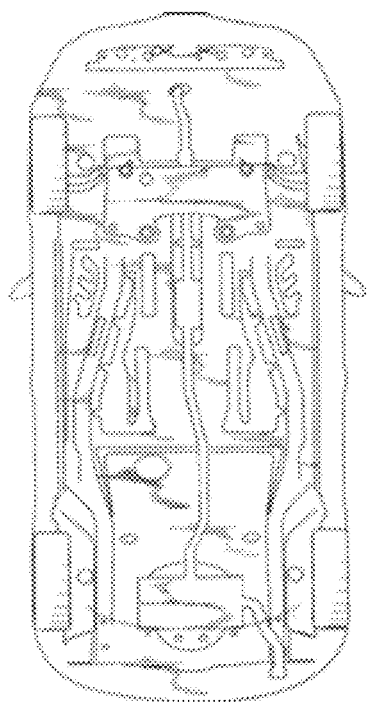
FIG. 2C is a schematic diagram of a multiplicity of blocks laid out and partitioned according to blank rows.

The dividing module 105 is operable to divide the black-and-white image into a multiplicity of blocks which contain words or figures, according to the information of the white pixels in the first histogram. The rows which only have white pixels are regarded as blank rows, and it is the blank rows which divide the black-and-white image into the multiplicity of blocks. FIG. 2C is a schematic diagram of the multiplicity of blocks laid out and partitioned according to the blank rows.

Figure 2D:
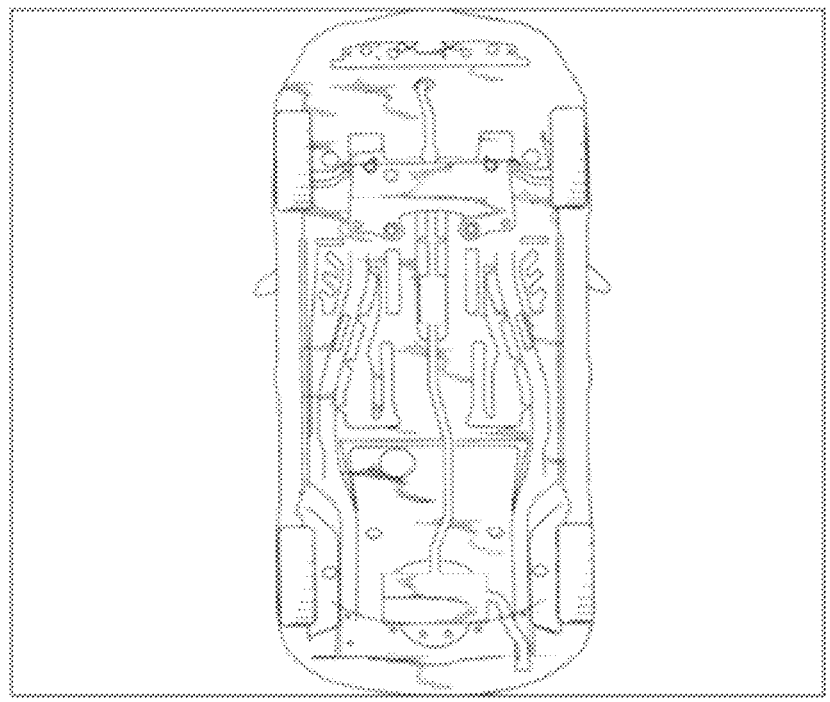
FIG. 2D is a schematic diagram of a block selected from FIG. 2C.

The selection module 106 is operable to select the blocks which have a height value greater than a predetermined height value. FIG. 2D is a schematic diagram of such a block, selected from FIG. 2C.

Figure 2E:
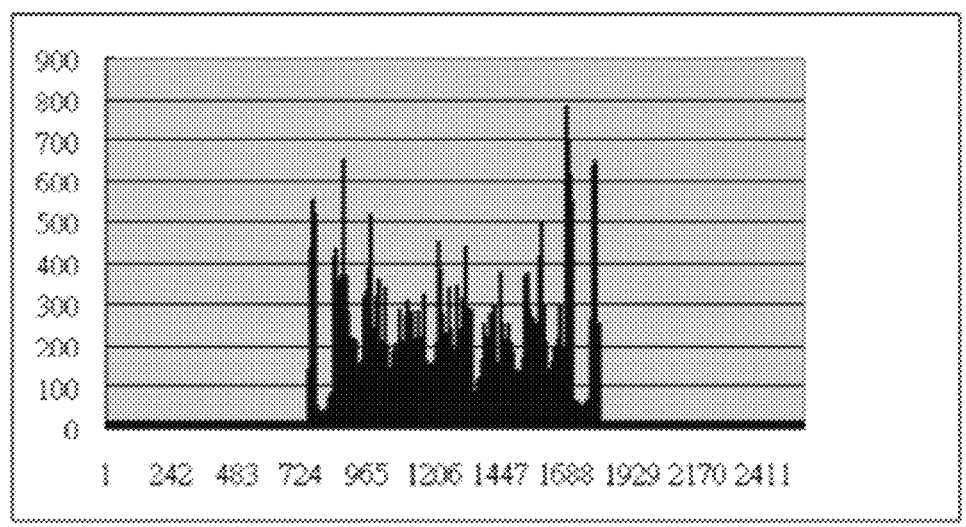
FIG. 2E is a second histogram based on pixel information of each line in the selected block in FIG. 2D.

The creation module 104 is further operable to create a second histogram based on information of the black pixels and the white pixels in each selected block. In the second histogram, the X-axis or horizontal axis represents the series of numbered lines from the left to the right of the selected block, and the Y-axis or vertical axis represents the quantity of the black pixels in each line of the selected block. FIG. 2E shows a second histogram based on the pixel information of each line in the selected block in FIG. 2D.

Figure 2F:
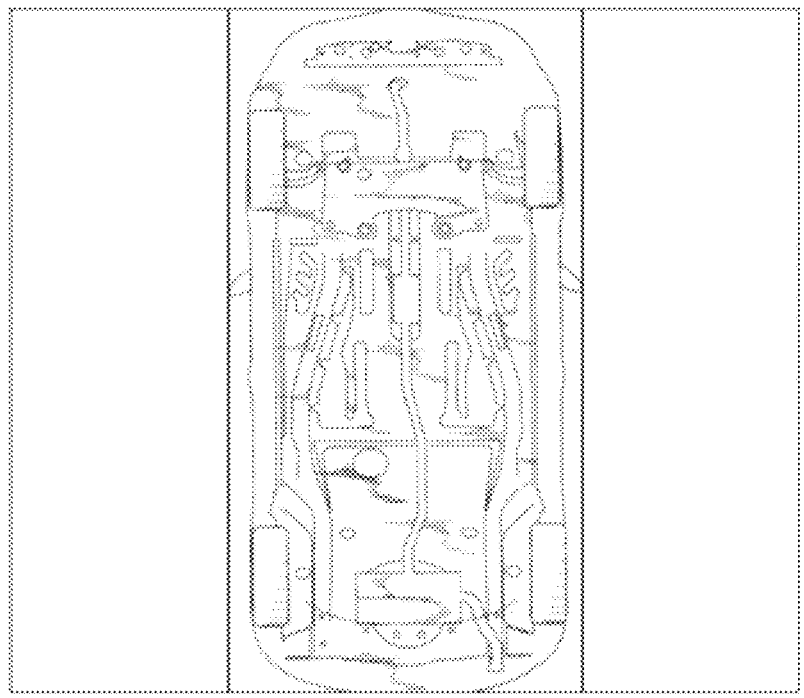
FIG. 2F is a schematic diagram of a multiplicity of areas laid out and partitioned according to blank lines.

The dividing module 105 is further operable to divide the selected block into a multiplicity of areas which contain words or figures, according to the information of the white pixels in the second histogram. The lines which only have white pixels are regarded as white or blank lines, and it is the blank lines which divide the selected block into the multiplicity of areas. FIG. 2F is a schematic diagram of the multiplicity of areas laid out and partitioned according to the blank lines.

Figure 2G:
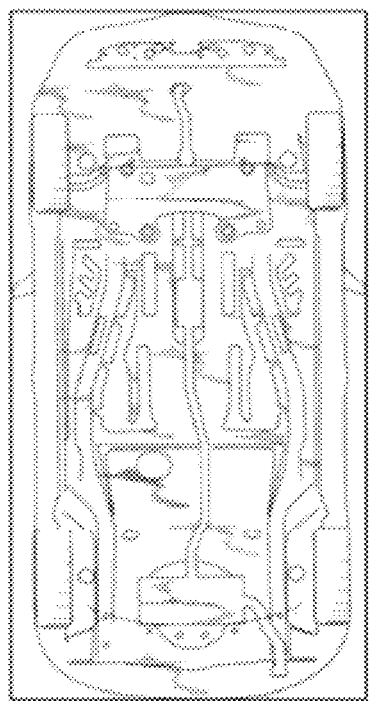
FIG. 2G is a schematic diagram of a figure area selected from FIG. 2F.

The selection module 106 is further operable to select the areas which have a width value greater than a predetermined width value, to maintain the integrity of figure areas that include the figures of the design patent. FIG. 2G is a schematic diagram of a figure area selected from FIG. 2F.

The display module 107 is operable to display the selected figure areas on the display device 3.

Figure 3:
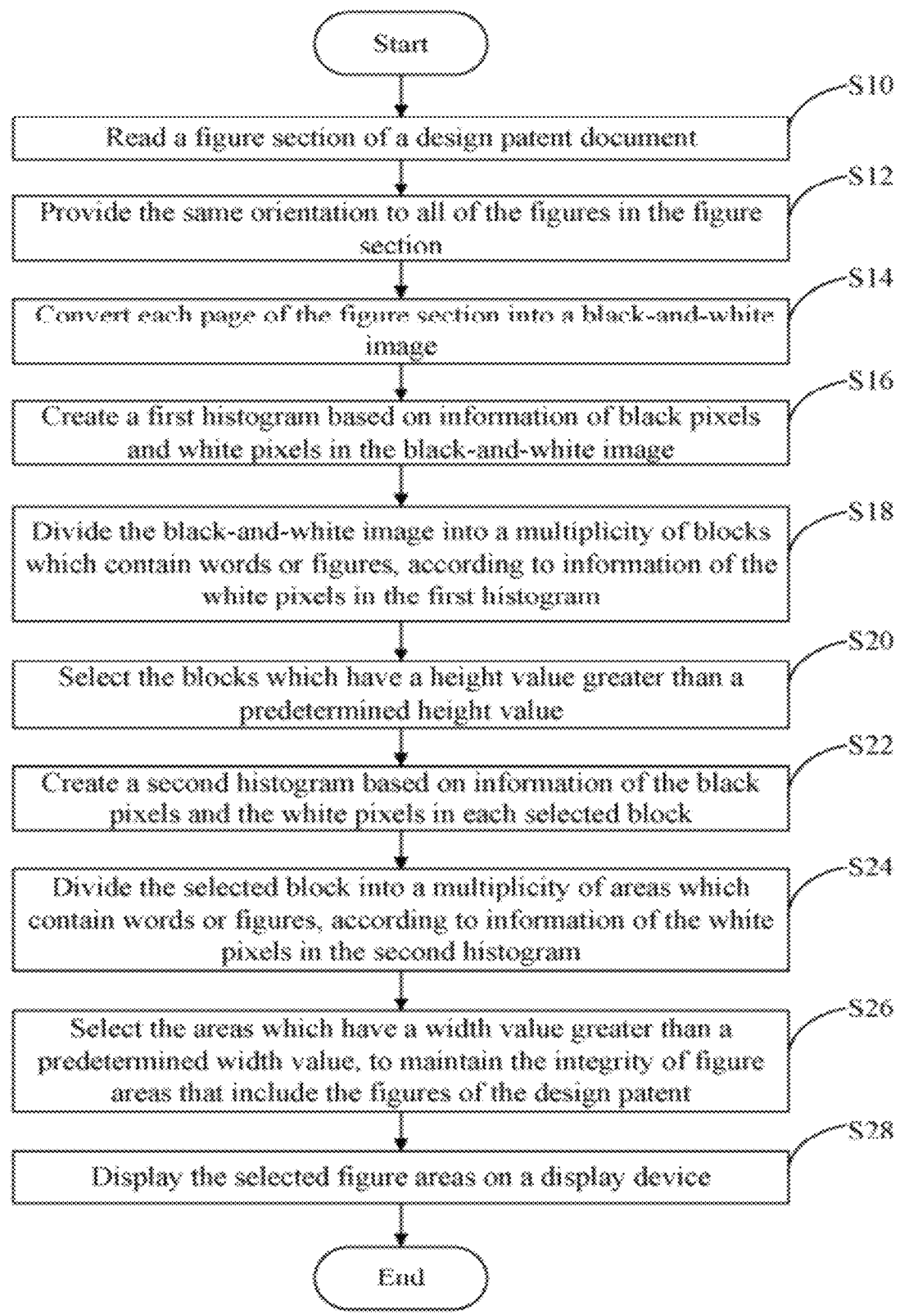
FIG. 3 is a flowchart of one embodiment of a method for isolating and cutting out figures in a design patent document.

FIG. 3 is a flowchart of one embodiment of a method for isolating and cutting out figures in a design patent document. Depending on the embodiment, additional steps may be added, others removed, and the ordering of the steps may be changed.

In step S10, the reading module 101 reads a figure section of the design patent document. The figure section of the design patent document includes one or more figures.

In step S12, the orientation module 102 provides the same orientation to all of the figures in the figure section.

In step S14, the conversion module 103 converts each page of the figure section into a black-and-white image.

In step S16, the creation module 104 creates a first histogram based on information of the black pixels and the white pixels in the black-and-white image.

In step S18, the dividing module 105 divides the black-and-white image into a multiplicity of blocks which contain words or figures, according to the information of the white pixels in the first histogram.

In step S20, the selection module 106 selects the blocks which have a height value greater than a predetermined height value.

In step S22, the creation module 104 creates a second histogram based on information of the black pixels and the white pixels in each selected block.

In step S24, the dividing module 105 divides the selected block into a multiplicity of areas which contain words or figures, according to the information of the white pixels in the second histogram.

In step S26, the selection module 106 selects the areas which have a width value greater than a predetermined width value, to maintain the integrity of figure areas that include the figures of the design patent.

In step S28, the display module 107 displays the selected figure areas on the display device 3.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method being performed by a processor of a computing device, comprising:
   (a) reading a figure section of a design patent document comprising one or more figures;
   (b) converting each page of the figure section into a black-and-white image;
   (c) creating a first histogram based on information of black pixels and white pixels in the black-and-white image;
   (d) dividing the black-and-white image into a multiplicity of blocks which contain words or figures, according to the information of the white pixels in the first histogram;
   (e) selecting the blocks which have a height value greater than a predetermined height value;
   (f) creating a second histogram based on information of the black pixels and the white pixels in each selected block;
   (g) dividing the selected block into a multiplicity of areas which contain words or figures, according to the information of the white pixels in the second histogram;
   (h) selecting the areas which have a width value greater than a predetermined width value; and
   (i) displaying the selected areas on a display device.

2. The method as claimed in claim 1, between the step (a) and the step (b) further comprising:
   providing the same orientation to all of the figures in the figure section.

3. The method as claimed in claim 1, wherein in the first histogram, the X-axis or horizontal axis represents the series of numbered rows from the bottom to the top of the black-and-white image, and the Y-axis or vertical axis represents the quantity of the black pixels in each row of the black-and-white image.

4. The method as claimed in claim 1, wherein in the second histogram, the X-axis or horizontal axis represents the series of numbered lines from the left to the right of the selected block, and the Y-axis or vertical axis represents the quantity of the black pixels in each line of the selected block.

5. A non-transitory storage medium storing a set of instructions, the set of instructions capable of being executed by a processor of a computing device to perform a method for isolating and cutting out figures in a design patent document, the method comprising:
   (a) reading a figure section of a design patent document comprising one or more figures;
   (b) converting each page of the figure section into a black-and-white image;
   (c) creating a first histogram based on information of black pixels and white pixels in the black-and-white image;
   (d) dividing the black-and-white image into a multiplicity of blocks which contain words or figures, according to the information of the white pixels in the first histogram;
   (e) selecting the blocks which have a height value greater than a predetermined height value;
   (f) creating a second histogram based on information of the black pixels and the white pixels in each selected block;
   (g) dividing the selected block into a multiplicity of areas which contain words or figures according to the information of the white pixels in the second histogram;
   (h) selecting the areas which have a width value greater than a predetermined width value; and
   (i) displaying the selected areas on a display device.

6. The non-transitory storage medium as claimed in claim 5, wherein between the step (a) and the step (b), the method further comprising:

providing the same orientation to all of the figures in the figure section.

7. The non-transitory storage medium as claimed in claim 5, wherein in the first histogram, the X-axis or horizontal axis represents the series of numbered rows from the bottom to the top of the black-and-white image, and the Y-axis or vertical axis represents the quantity of the black pixels in each row of the black-and-white image.

8. The non-transitory storage medium as claimed in claim 5, wherein in the second histogram, the X-axis or horizontal axis represents the series of numbered lines from the left to the right of the selected block, and the Y-axis or vertical axis represents the quantity of the black pixels in each line of the selected block.

9. A computing device, the computing device being connected to a display device, the computing device comprising:
a storage unit;
at least one processor; and
one or more programs stored in the storage unit, executable by the at least one processor, the one or more programs comprising:
a reading module operable to read a figure section of a design patent document comprising one or more figures;
a conversion module operable to convert each page of the figure section into a black-and-white image;
a creation module operable to create a first histogram based on information of black pixels and white pixels in the black-and-white image;
a dividing module operable to divide the black-and-white image into a multiplicity of blocks which contain words or figures, according to the information of the white pixels in the first histogram;
a selection module operable to select the blocks which have a height value greater than a predetermined height value;
the creation module further operable to create a second histogram based on information of the black pixels and the white pixels in each selected block;
the dividing module further operable to divide the selected block into a multiplicity of areas which contain words or figures, according to the information of the white pixels in the second histogram;
the selection module further operable to select the areas which have a width value greater than a predetermined width value and a display module operable to display the selected areas on the display device.

10. The computing device as claimed in claim 9, wherein the one or more programs further comprising:
a orientation module operable to provide the same orientation to all of the figures in the figure section.

11. The computing device as claimed in claim 9, wherein in the first histogram, the X-axis or horizontal axis represents the series of numbered rows from the bottom to the top of the black-and-white image, and the Y-axis or vertical axis represents the quantity of the black pixels in each row of the black-and-white image.

12. The computing device as claimed in claim 9, wherein in the second histogram, the X-axis or horizontal axis represents the series of numbered lines from the left to the right of the selected block, and the Y-axis or vertical axis represents the quantity of the black pixels in each line of the selected block.

* * * * *